United States Patent
Seo et al.

(10) Patent No.: US 10,586,451 B2
(45) Date of Patent: Mar. 10, 2020

(54) APPARATUS AND METHOD FOR CONTROLLING PARKING

(71) Applicant: HYUNDAI MOTOR COMPANY, Seoul (KR)

(72) Inventors: Gil Won Seo, Hwaseong-si (KR); Joo Woong Yang, Seoul (KR); Wan Seok Yang, Seoul (KR); Jun Soo Kim, Seoul (KR); Sung Yun Kim, Seoul (KR); Chan Hee Jung, Anyang-si (KR); Min Wook Seo, Suwon-si (KR)

(73) Assignee: HYUNDAI MOTOR CCOMPANY, Seoul (KR)

( * ) Notice: Subject to any disclaimer, the term of this patent is extended or adjusted under 35 U.S.C. 154(b) by 208 days.

(21) Appl. No.: 15/366,410

(22) Filed: Dec. 1, 2016

(65) Prior Publication Data
US 2018/0075744 A1 Mar. 15, 2018

(30) Foreign Application Priority Data

Sep. 9, 2016 (KR) ........................ 10-2016-0116608

(51) Int. Cl.
*G08G 1/14* (2006.01)
*G01C 21/36* (2006.01)
(Continued)

(52) U.S. Cl.
CPC ......... *G08G 1/143* (2013.01); *G01C 21/3605* (2013.01); *G01C 21/3685* (2013.01);
(Continued)

(58) Field of Classification Search
CPC .. G08G 1/143; G01C 21/3605; G05D 1/0088; G05D 1/021
(Continued)

(56) References Cited

U.S. PATENT DOCUMENTS 6,266,609 B1 7/2001 Fastenrath
8,712,683 B2 4/2014 Nakamura
(Continued)

FOREIGN PATENT DOCUMENTS

JP 2002-240661 A 8/2002
JP 2005-161996 A 6/2005
(Continued)

OTHER PUBLICATIONS

Office Action issued in corresponding Korean Patent Application No. 10-2016-0116608, dated Jul. 17, 2017.

*Primary Examiner* — Lail A Kleinman
*Assistant Examiner* — Mahmoud M Kazimi
(74) *Attorney, Agent, or Firm* — Morgan, Lewis & Bockius LLP

(57) ABSTRACT

An apparatus for controlling parking includes a parking situation recognizer recognizing a parking situation of a vehicle based on information received from navigation and converting an operation mode of the vehicle into a parking mode; a parking space searcher setting an operation sensor based on information on a parking zone received from the navigation at the time of performing the conversion into the parking mode, and searching for a parking space using the operation sensor; and a parking controller configured to control the parking of the vehicle based on the searched parking space.

14 Claims, 9 Drawing Sheets

(51) Int. Cl.
*G05D 1/02* (2020.01)
*G05D 1/00* (2006.01)

(52) U.S. Cl.
CPC .......... *G05D 1/0088* (2013.01); *G05D 1/021* (2013.01); *G08G 1/146* (2013.01); *G08G 1/147* (2013.01)

(58) Field of Classification Search
USPC .......................................................... 701/25
See application file for complete search history.

(56) References Cited

U.S. PATENT DOCUMENTS

| | | | |
|---|---|---|---|
| 2006/0178810 A1* | 8/2006 | Hashima | G01C 21/28 701/532 |
| 2008/0136674 A1* | 6/2008 | Jang | G08G 1/017 340/932.2 |
| 2009/0167564 A1* | 7/2009 | Long-Tai | B62D 15/0285 340/932.2 |
| 2012/0221207 A1 | 8/2012 | Nakamura | |
| 2015/0127222 A1* | 5/2015 | Cunningham, III | B60Q 1/488 701/41 |
| 2017/0355307 A1* | 12/2017 | Ha | G08G 1/143 |
| 2019/0009773 A1* | 1/2019 | Miyahara | B60W 30/06 |

FOREIGN PATENT DOCUMENTS

| | | |
|---|---|---|
| JP | 2010-137857 A | 6/2010 |
| JP | 2011-070411 A | 4/2011 |
| JP | 2011-235677 A | 11/2011 |
| JP | 2014-006114 A | 1/2014 |
| JP | 2014-100957 A | 6/2014 |
| JP | 2015-174531 A | 10/2015 |
| KR | 10-2009-0040024 A | 4/2009 |
| KR | 10-2016-0031910 A | 3/2016 |
| KR | 10-2016-0103208 A | 9/2016 |

* cited by examiner

APPARATUS AND METHOD FOR CONTROLLING PARKING

CROSS-REFERENCE TO RELATED APPLICATION

This application is based on and claims the benefit of priority to Korean Patent Application No. 10-2016-0116608, filed on Sep. 9, 2016 in the Korean Intellectual Property Office, the disclosure of which is incorporated herein in its entirety by reference.

TECHNICAL FIELD

The present disclosure relates to an apparatus and a method for controlling parking.

BACKGROUND

A parking steering assist system or smart parking assist system is a system which is activated when a driver selects a parking mode such as a right angled parking right/left, a parallel parking right/left, a parallel parking-out, or the like, and drives a vehicle at a predetermined speed or less to search for a parking space. Such a system performs a control of a steering, a vehicle speed, and a transmission into the corresponding space to assist in a parking.

In order to activate the system, the driver should always manipulate a system button. However, since the system performs the search for the parking space, the system passes a desired parking space without dropping even in a case in which there is the desired parking space if the driver does not manipulate the system button after the vehicle enters a parking lot. In this case, if the driver manipulates the system button after passing the parking space, the system should search for another parking space because the system may not search for the parking space which is already passed.

As a result, convenience of a user may be degraded, and much time and power for searching for the parking space may be consumed.

SUMMARY

The present disclosure has been made to solve the above-mentioned problems occurring in the prior art while advantages achieved by the prior art are maintained intact.

An aspect of the present disclosure provides an apparatus and a method for controlling parking capable of automatically performing a parking mode and searching for a parking space using navigation information and vehicle information when a vehicle enters a parking lot.

An aspect of the present disclosure also provides an apparatus and a method for controlling parking capable of minimizing a parking space search time and minimizing power consumed in searching for a parking space by determining an operation sensor utilizing to information on a parking zone provided from navigation.

According to an exemplary embodiment of the present disclosure, an apparatus for controlling parking includes: a parking situation recognizer recognizing a parking situation of a vehicle based on information received from navigation and converting an operation mode of the vehicle into a parking mode; a parking space searcher setting an operation sensor based on information on a parking zone received from the navigation at the time of performing the conversion into the parking mode, and searching for a parking space using the operation sensor, and a parking controller configured to control the parking of the vehicle based on the searched parking space.

According to another exemplary embodiment of the present disclosure, a method for controlling parking includes: recognizing, by a parking situation recognizer, a parking situation of a vehicle based on information received from navigation; converting, by the a parking situation recognizer, an operation mode of the vehicle into a parking mode when the parking situation is recognized; setting, by a parking space searcher, an operation sensor based on information on a parking zone received from the navigation at the time of performing the conversion into the parking mode, and searching for a parking space using the operation sensor, and controlling, by a parking controller, the parking of the vehicle based on the searched parking space.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
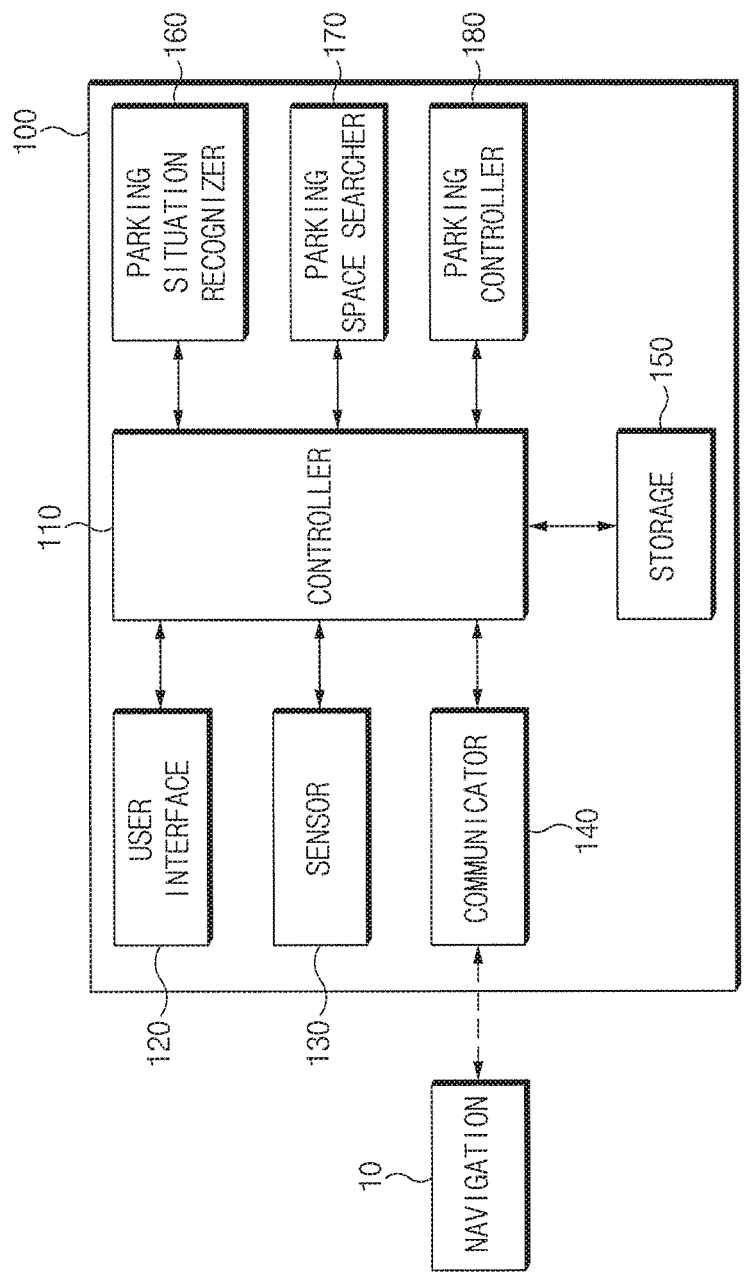
FIG. 1 is a diagram illustrating a configuration of an apparatus for controlling parking according to an exemplary embodiment of the present disclosure.

It is to be noted that technical terms used in the specification are used for describing specific embodiments and do not limit the present disclosure. In addition, unless indicated otherwise in the present disclosure, it is to be understood that all the technical terms used in the present disclosure are construed as meaning as those that are generally understood by those who skilled in the art and are not construed as excessively comprehensive meanings and excessively reduced meanings. In addition, when the technical terms used in the present disclosure are wrong technical terms that do not accurately indicate the technical spirit of the present disclosure, it is to be understood that the terms are replaced with the technical terms understood by those skilled in the art. Further, the general terms used in the present disclosure must be understood according to the meanings defined by the dictionary or the context and should not be excessively reduced meanings.

In addition, singular forms used in the present disclosure are intended to include plural forms unless the context clearly indicates otherwise. In the present disclosure, it is to be noted that the terms "comprising" or "including', and the like, are not be construed as necessarily including several components or several steps described in the present disclosure and some of the above components or steps may not be included or additional components or steps are construed as being further included.

In addition, terms including an ordinal number such as first, second, or the like, used in the present disclosure may be used to describe components. However, these components are not limited to these terms. The terms are only used to distinguish one component from another component. For example, the 'first' component may be named as the 'second' component, and vice versa, without departing from the scope of the present disclosure.

Hereinafter, exemplary embodiments of the present disclosure will be described in more detail with reference to the accompanying drawings. The same reference numerals will be used to describe the same or like components, independent of the reference numerals and an overlapped description of the same components will be omitted.

Further, when it is determined that the detailed description of the known art related to the present disclosure may obscure the gist of the present disclosure, the detailed description thereof will be omitted. In addition, it is to be noted that the accompanying drawings are provided only in order to allow the spirit of the present disclosure to be easily understood and is to be interpreted as limiting the spirit of the present disclosure.

FIG. 1 is a diagram illustrating a configuration of an apparatus for controlling parking according to an exemplary embodiment of the present disclosure.

Referring to FIG. 1, an apparatus 100 for controlling parking may include a controller 110, a user interface 120, a sensor 130, a communicator 140, a storage 150, a parking situation recognizer 160, a parking space searcher 170, and a parking controller 180. Here, the controller 110 may process signals transmitted between the respective components of the apparatus 100 for controlling parking.

First, the user interface 120 may include input means for receiving a control instruction from a user, and an output means for outputting an operation state and result of the apparatus 100.

Here, the input means may correspond to a key button, and may also correspond to a mouse, a joystick, a jog shuttle, a stylus pen, or the like. In addition, the input means may also correspond to a soft key implemented on a display.

The output means may include the display, and may also include a voice output means such as a speaker. Here, in the case in which a touch sensor such as a touch film, a touch sheet, a touch pad, or the like is included in the display, the display may be operated as a touch screen, and may be implemented in a form in which the input means and the output means are integrated.

Here, the display may include at least one of a liquid crystal display (LCD), a thin film transistor-liquid crystal display (TFT LCD), an organic light-emitting diode (OLED), a flexible display, a field emission display (FED), and a three-dimensional (3D) display.

The sensor 130 may include one or more sensors that detect obstacles positioned around a vehicle and measure a distance between the obstacles. As an example, the sensor 130 may include an ultrasonic sensor, a scanner, a camera, and the like. In addition to this, as long as the sensor may detect the obstacle and may measure the distance between the obstacles, any sensor may be used.

The sensor 130 may further include a sensor measuring speed of the vehicle.

The communicator may include a communication module that supports a communication interface with electronic components and/or control units included in the vehicle. As an example, the communication module may be communicatively connected to navigation 10 included in the vehicle to receive self-vehicle position information, destination information, surrounding situation information, parking zone information, and the like from the navigation 10.

Here, the communication module may include a module that supports vehicle network communication such as controller area network (CAN) communication, local interconnect network (LIN) communication, flex-ray communication, and the like.

In addition, the communication module may include a module for wireless Internet connection or a module for short range communication. Here, a wireless Internet technology may include wireless local area network (WLAN), Wireless Broadband Wibro, Wi-Fi, world interoperability for microwave access (Wimax), high speed downlink packet access (HSDPA), and the like, and the short range communication technology may include Bluetooth, ZigBee, Ultra Wideband (UWB), radio frequency identification (RFID), infrared data association (IrDA), and the like.

The storage 150 may store data and/or algorithms necessary to operate the apparatus 100 for controlling parking.

The storage 150 may store the information received from the navigation 10 through the communicator 140. In addition, the storage 150 may store condition information for automatically converting the apparatus 100 into a parking mode, and may store an algorithm that determines whether or not a parking mode conversion condition is satisfied. In addition, the storage 150 also stores an instruction and/or an algorithm for searching for a parking space and/or controlling an automatic parking.

Here, the storage 150 may include a storage medium such as a random access memory (RAM), a static random access memory (SRAM), a read-only memory (ROM), a programmable read-only memory (PROM), and an electrically erasable programmable read-only memory (EEPROM).

If the self-vehicle position information, the destination information, the surrounding situation information, and the like are received from the navigation 10, the controller 110 transmits the received information to the parking situation recognizer 160. In addition, the controller 110 transmits speed information of the vehicle sensed by the sensor 130 to the parking situation recognizer 160.

In this case, the parking situation recognizer 160 determines whether or not a position and speed of the vehicle satisfy the parking mode conversion condition based on the information transmitted from the controller 110, and converts an operation mode of the vehicle into a parking mode when a parking situation is recognized depending on a determination result.

Here, the operation mode of the vehicle may include a drive mode and a parking mode, and the parking mode may include a right angled parking mode, a parallel parking mode, and a parallel parking-out mode.

As an example, if there is destination information set in the navigation 10, the parking situation recognizer 160 compares a position of the self-vehicle and the destination information set in the navigation 10 to each other, and checks whether or not the position of the self-vehicle is within a preset radius from a destination set in the navigation 10. In addition, the parking situation recognizer 160 checks whether or not speed of the self-vehicle is less than a first preset reference speed. If the position of the self-vehicle is within the preset radius from the destination set in the navigation 10 and the speed of the self-vehicle is less than the first preset reference speed, the parking situation recognizer 160 may recognize a parking situation.

If there is no destination information set in the navigation 10, the parking situation recognizer 160 checks whether or not the vehicle enters the parking lot, or an emergency light or a directional signal of the vehicle is turned-on around the parking zone. In addition, the parking situation recognizer 160 checks whether or not speed of the self-vehicle is less than a second preset reference speed. If the vehicle enters the parking lot, or the emergency light or the directional signal of the vehicle is turned-on around the parking zone, and the speed of the self-vehicle is less than the second preset reference speed, the parking situation recognizer 160 may recognize a parking situation.

As such, if the position and speed of the vehicle satisfy a preset parking mode conversion condition to recognize the parking situation, the parking situation recognizer 160 automatically converts a vehicle mode into a parking mode without performing a separate control.

If the parking situation recognizer 160 converts the vehicle mode into the parking mode, the parking situation recognizer 160 transmits converted mode information to the controller 110. Accordingly, the controller 110 transmits a control signal for searching for a parking space to the parking space searcher 170.

The parking space searcher 170 searches for the parking space around the vehicle according to the control signal from the controller 110. The parking space searcher 170 may control operations of one or more sensors for searching for the parking space, and may search for the parking space using information sensed by one or more sensors.

If the controller 110 receives information on the parking zone around the vehicle from the navigation 10, for example, parking form information such as the right angled parking and the parallel parking, parking direction information, a width and a degree of complexity of a street of the parking zone, and the like, the controller 110 may transfer the received parking zone information to the parking space searcher 170.

In this case, the parking space searcher 170 may determine one or more operation sensors of the sensors of the sensor 130 with reference to the parking zone information transmitted from the controller 110, and set a search period of the sensor, to thereby search for the parking space.

As an example, if the speed of the self-vehicle is a third preset reference speed or more and the width of the street of the parking zone exceeds a parking rotation radius of the vehicle based on the parking zone information, the parking space searcher 170 may set a right front-side sensor to a long distance mode to search for the parking space at a period of 100 ms.

As another example, if the speed of the self-vehicle is the third preset reference speed or more and the width of the street of the parking zone is the parking rotation radius or less of the vehicle based on the parking zone information, the parking space searcher 170 may set the right front-side sensor to the long distance mode to search for the parking space at a period of 100 ms and may set the let front-side sensor to a short distance mode to search for the parking space at a period of 50 ms.

As such, since the parking space searcher 170 performs a control so that only a sensor necessary to search for the parking space is operated, a parking space search time may be minimized and power consumed in searching for the parking space may be minimized.

If the search of the parking space is completed by the parking space searcher 170, the parking controller 180 controls a drive unit of the vehicle to control the parking of the vehicle based on the parking space searched by the parking space searcher 170.

A detailed operation flow of the apparatus for controlling parking according to the present disclosure having the configuration as described above will be described in more detail with reference to FIGS. 2 to 8.

Figure 2:
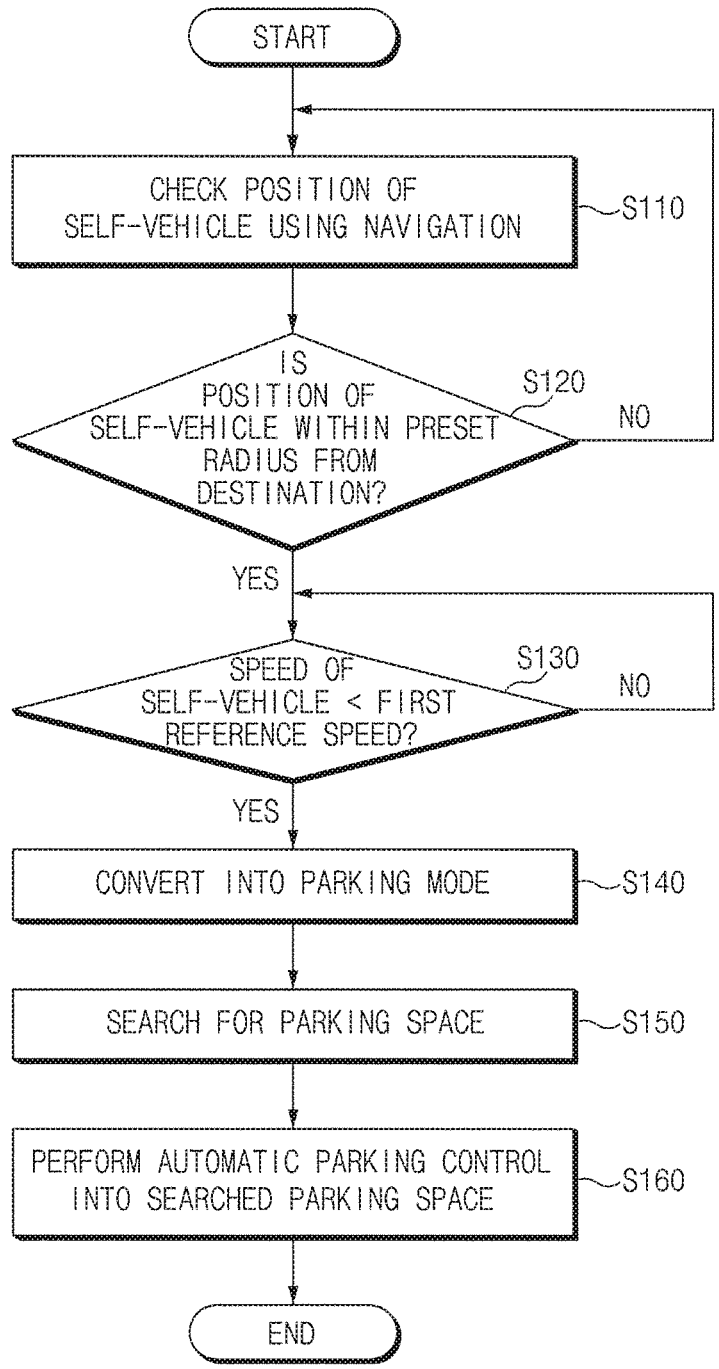
FIGS. 2 to 8 are reference diagrams illustrating an operation of the apparatus for controlling parking according to an exemplary embodiment of the present disclosure.

First, FIG. 2 illustrates a flow of a parking control operation in a case in which the destination is set in the navigation. Referring to FIG. 2, the apparatus 100 checks a position of a self-vehicle and a position of a destination using the navigation 10 (S110).

If the position of the self-vehicle checked in 'S110' is within the preset radius from the destination (S120) and the speed of the self-vehicle is less than the first reference speed (S130), the apparatus 100 for controlling a parking may recognize a parking situation.

Figure 3:
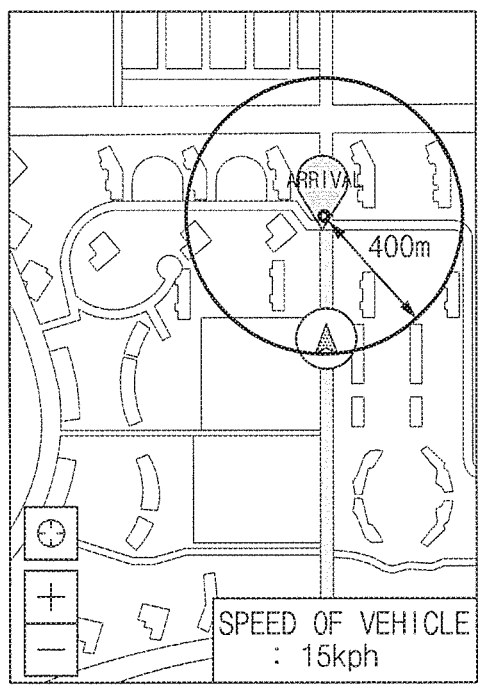

As an example, the parking situation in 'S120' and 'S130' may be illustrated as in FIG. 3. As illustrated in FIG. 3, if the vehicle is positioned within a radius of 400 m from the destination of the navigation 10 and the speed of the vehicle is 15 kph, which is less than the first reference speed in a state in which the destination is set in the navigation 10, the apparatus 100 for recognizes the parking situation.

Therefore, the apparatus 100 automatically converts the vehicle mode into the parking mode (S140).

If the vehicle mode is converted into the parking mode, the apparatus 100 for controlling parking searches for the parking space around the destination (S150) by controlling the operations of one or more sensors included in the vehicle, and performs an automatic parking control into the perking space searched in S150 (S160).

Figure 4:
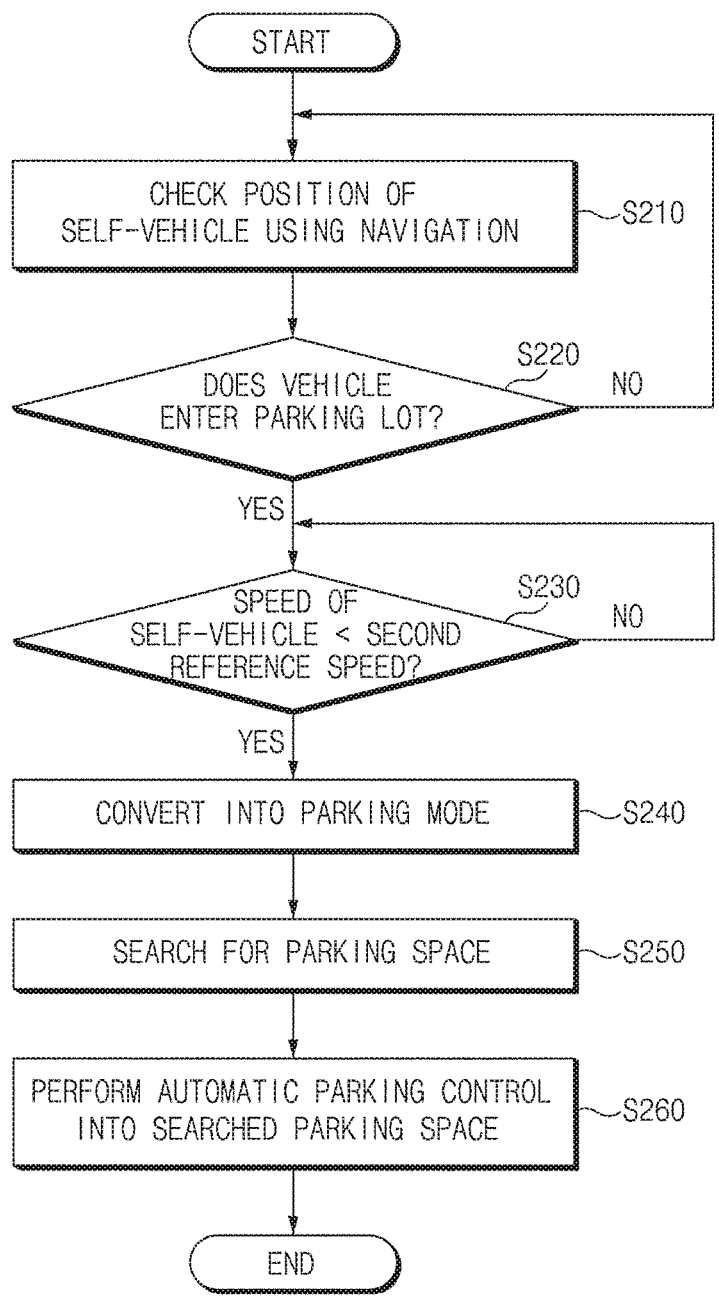

FIG. 4 illustrates a flow of a parking control operation of the vehicle entering the parking lot in a case in which the destination is not set in the navigation.

Referring to FIG. 4, the apparatus 100 checks a position of a self-vehicle and a position of a parking lot using the navigation 10 (S210).

If the position of the self-vehicle checked in 'S210' is checked as entering the parking lot (S220) and the speed of the self-vehicle is less than the second reference speed (S230), the apparatus 100 may recognize the parking situation.

Figure 5:
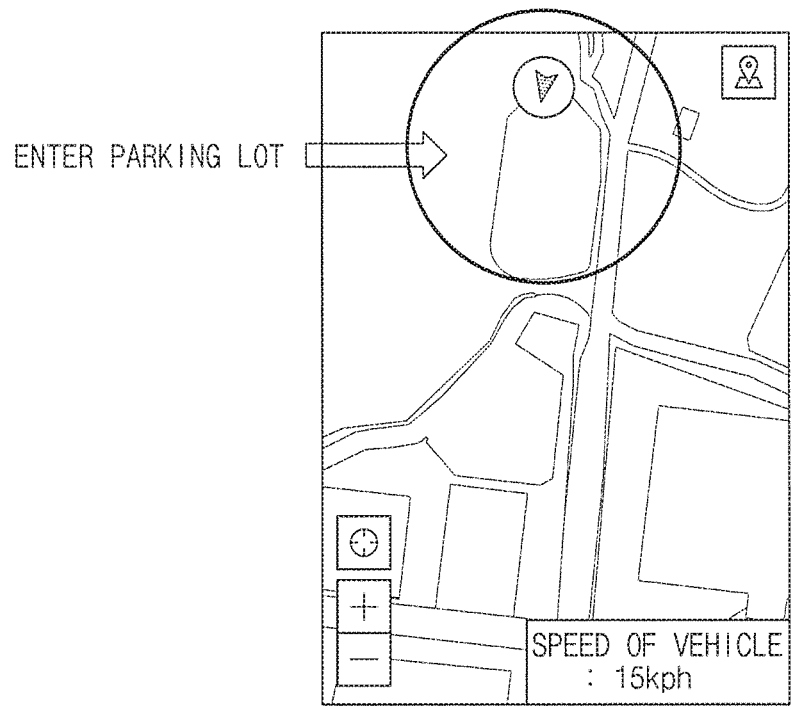

As an example, the parking situation in 'S220' and 'S230' may be illustrated as in FIG. 5. As illustrated in FIG. 5, if the speed of the vehicle is 5 kph, which is less than the second reference speed in a state in which the vehicle enters the parking lot as a result of comparing the position of the self-vehicle and the position of the parking lot checked by the navigation 10, the apparatus 100 recognizes the parking situation.

Therefore, the apparatus 100 automatically converts the vehicle mode into the parking mode (S240).

If the vehicle mode is converted into the parking mode, the apparatus 100 searches for the parking space around the destination (S250) by controlling the operations of one or more sensors included in the vehicle, and performs an automatic parking control into the parking space searched in 'S250' (S260).

Figure 6:
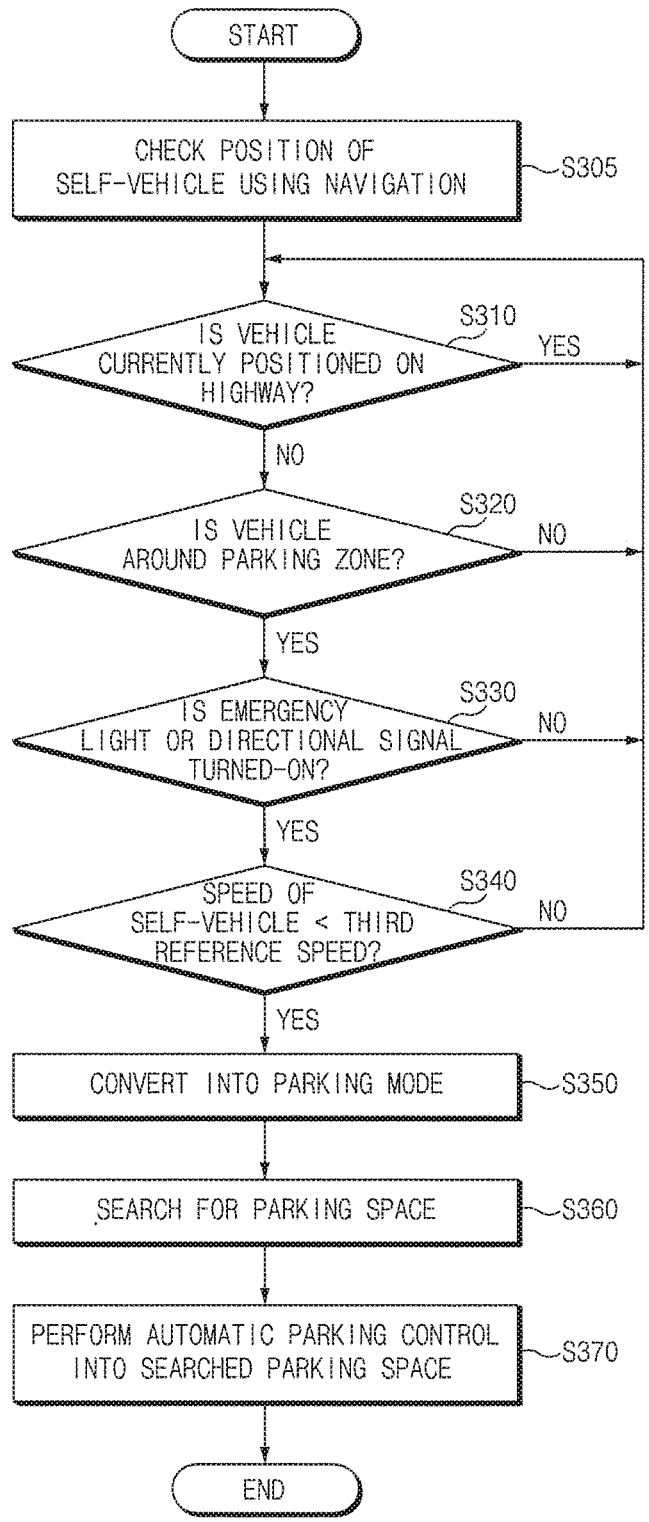

In addition, FIG. 6 illustrates a flow of a parking control operation according to a state of the vehicle in a case in which the destination is not set in the navigation.

Referring to FIG. 6, the apparatus 100 for controlling a parking checks the position of the self-vehicle using the navigation 10 (S305).

If the position of the self-vehicle is not on a highway (S310) and is around the parking zone (S320), the apparatus 100 may recognize the parking situation according to the turn-on of the emergency light or the directional signal of the vehicle and the speed of the self-vehicle.

If the emergency light or the directional signal of the vehicle is turned-on around the parking zone (S330) and the speed of the self-vehicle is less than the second reference speed (S340), the apparatus 100 may recognize the parking situation.

Figure 7:
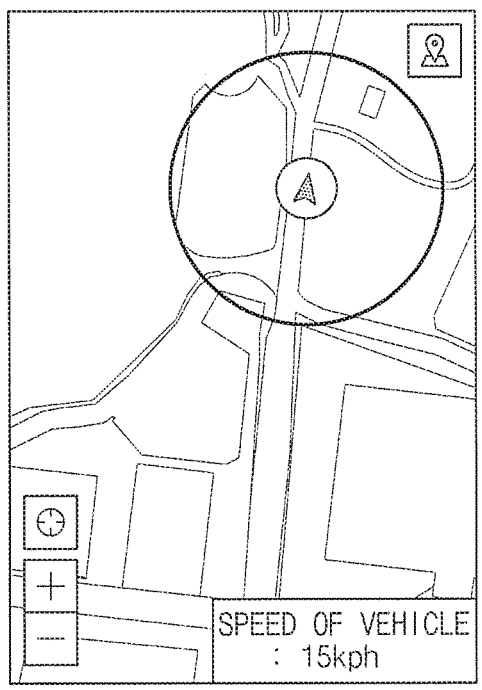

As an example, the parking situation in 'S320' to 'S340' may be illustrated as in FIG. 7. As illustrated in FIG. 7, if the emergency light or the directional signal of the vehicle is turned-on and the speed of the vehicle is 5 kph, which is less than the second reference speed in a case in which the position of the self-vehicle checked by the navigation 10 is not positioned on the highway and is positioned around the parking zone such as the parking lot, a shoulder parking zone, or the like, or a road of a city, the apparatus 100 may recognize the parking situation.

Therefore, the apparatus 100 automatically converts the vehicle mode into the parking mode (S350).

If the vehicle mode is converted into the parking mode, the apparatus 100 searches for the parking space around the destination (S360) by controlling the operations of one or more sensors included in the vehicle, and performs an automatic parking control into the parking space in 'S360' (S370).

Figure 8:
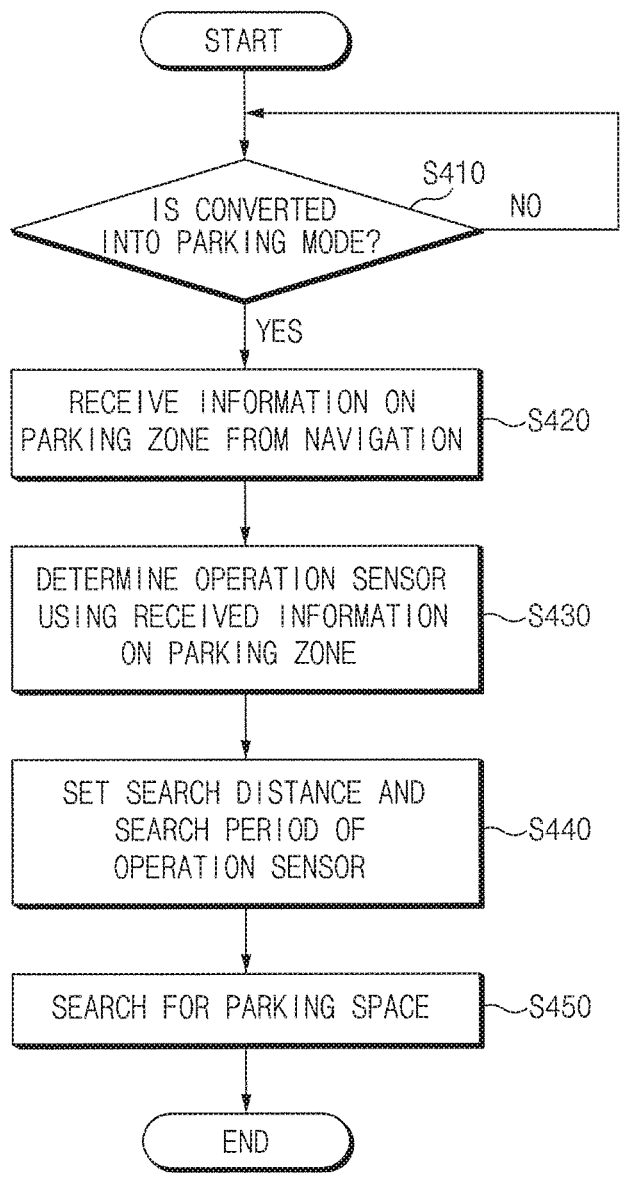

Meanwhile, FIG. 8 illustrates a flow of an operation searching for the parking space using the parking zone information of the navigation.

Referring to FIG. 8, if the vehicle is converted into the parking mode by the parking situation in FIG. 2, 4 or 6 (S410), the apparatus 100 may receive the information on the parking zone around the vehicle from the navigation 10 (S420). The information on the parking zone around the vehicle received from the navigation 10 in 'S420' may be information provided by the navigation 10 without a separate request, and may also be information requested by the apparatus 100 before 'S420'.

As such, if the information on the parking zone around the vehicle is received from the navigation 10, the apparatus 100 may detect the parking form information such as the right angled parking or the parallel parking, the parking direction information, the width and the degree of complexity of the street of the parking zone, and the like from the received information on the parking zone, and determine one or more operation sensors for searching for the parking space utilizing the detected information (S430).

As an example, if the speed of the self-vehicle exceeds the reference speed and the rotation radius at the time of performing the parking is sufficient because the width of the street of the parking lot is wide, the apparatus 100 may determine a right front-side sensor as an operation sensor.

As another example, if the speed of the self-vehicle is the reference speed or less and the rotation radius at the time of performing the parking is insufficient because the width of the street of the parking lot is narrow, which requires an obstacle to be checked, the apparatus 100 may determine the right front-side sensor and a left front-side sensor as the operation sensor.

If the operation sensor is determined in 'S430', the apparatus 100 sets a search distance and a search period of the operation sensor according to an environment of the parking zone (S440).

As an example, if the operation sensor is the right front-side sensor, the apparatus 100 may set the right front-side sensor to a long distance mode and may set the search period to 100 ms. Meanwhile, if the operation sensor is the right front-side sensor and the left front-side sensor, the apparatus 100 may set the right front-side sensor to the long distance mode and may set the search period to 100 ms. In this case, the apparatus 100 may set the left front-side sensor for checking the obstacle to a short distance mode and may set the search period to 50 ms.

As such, if the operation sensor is determined, and the settings of the search distance and the search period of the determined operation sensor are completed, the apparatus 100 searches for the parking space using the set operation sensor (S450).

Figure 9:
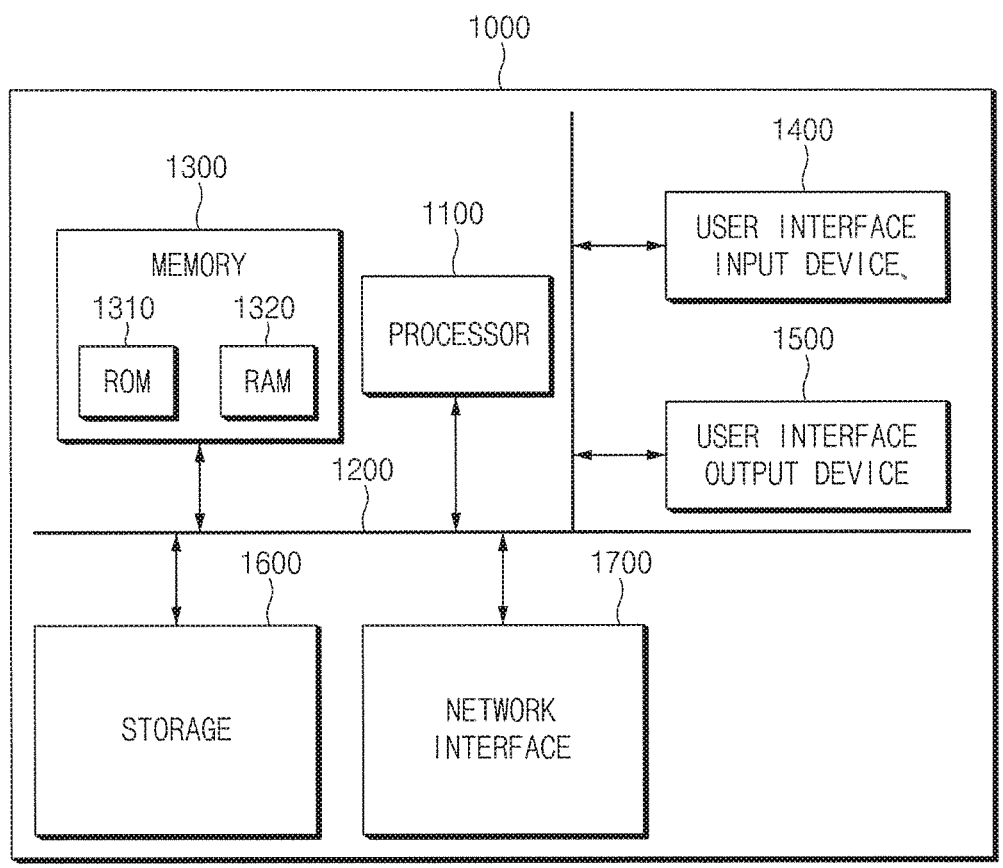
FIG. 9 is a block diagram illustrating a configuration of a computing system implementing an apparatus according to an embodiment of the present disclosure.

FIG. 9 is a diagram illustrating a computing system to which the apparatus according to the present disclosure is applied.

Referring to FIG. 9, a computing system 1000 may include at least one processor 1100, a memory 1300, a user interface input device 1400, a user interface output device 1500, a storage 1600, and a network interface 1700 connected through a bus 1200.

The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Therefore, steps of a method or an algorithm described in association with the embodiments disclosed in the specification may be directly implemented by hardware and software modules executed by the processor 1100, or a combination thereof. The software module may reside in storage media (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in a personal terminal. As yet another method, the processor and the storage medium may reside in the personal terminal as individual components.

The above description just illustrates the technical spirit of the present disclosure and various modifications and transformations can be made to those skilled in the art without departing from an essential characteristic of the present disclosure.

Therefore, the exemplary embodiments disclosed in the present disclosure are used to not limit but describe the technical spirit of the present disclosure and the scope of the technical spirit of the present disclosure is not limited by the exemplary embodiments. The scope of the present disclosure should be interpreted by the appended claims and it should be analyzed that all technical spirit in the equivalent range is intended to be embraced by the scope of the present disclosure.

What is claimed is:

1. An apparatus for controlling parking, the apparatus comprising a controller configured to:
   determine whether or not a position and a speed of a vehicle satisfy a preset parking mode conversion condition based on information received from a navigation system;
   recognize a parking situation of the vehicle depending on whether or not destination information is set in the navigation system and a determination result;
   convert an operation mode of the vehicle into a parking mode;
   set an operation sensor based on information on a parking zone received from the navigation system at the time of performing the conversion into the parking mode;
   search for a parking space using the operation sensor; and control parking of the vehicle based on the searched parking space, wherein, when there is destination information set in the navigation system, the controller compares the position of the vehicle and the destination information to each other, and recognizes the parking situation when the vehicle is positioned within a preset radius from a destination and the speed of the vehicle is less than a first reference speed, and wherein, when there is no destination information set in the navigation system, the controller checks whether an emergency light of the vehicle is turned-on and whether the speed of the vehicle is less than a second reference speed, and recognizes the parking situation when the emergency light of the vehicle is turned-on and the speed of the vehicle is less than the second reference speed.

2. The apparatus according to claim 1, wherein when there is no destination information set in the navigation system, the controller compares the position of the vehicle and parking lot information to each other, and recognizes the parking situation when the vehicle enters a parking lot and the speed of the vehicle is less than the second reference speed.

3. The apparatus according to claim 1, wherein the controller recognizes the parking situation when the emergency light or the directional signal of the vehicle is turned-on at the time of driving on a road of a city and the speed of the vehicle is less than the second reference speed.

4. The apparatus according to claim 1, wherein the information on the parking zone received from the navigation system includes at least one of parking form information, parking direction information, and a width and a degree of complexity of a street of the parking zone.

5. The apparatus according to claim 1, wherein the controller selects one or more operation sensors based on the information on the parking zone received from the navigation system, and sets a search distance and a search period of the selected operation sensor.

6. The apparatus according to claim 5, wherein when the speed of the vehicle exceeds a third reference speed, and a width of a street of the parking zone is a rotation radius or more of the vehicle, the controller selects a first sensor positioned in a parking direction as the operation sensor.

7. The apparatus according to claim 5, wherein when the speed of the vehicle is a third reference speed or less, and a width of a street of the parking zone is within a rotation radius of the vehicle, the controller selects a first sensor positioned in a parking direction and a second sensor positioned in a direction opposite to the parking direction as the operation sensor.

8. A method for controlling parking, the method comprising steps of:
determining, by a controller, whether or not a position and a speed of a vehicle satisfy a preset parking mode conversion condition based on information received from a navigation system;
recognizing, by the controller, a parking situation of the vehicle depending on whether or not destination information is set in the navigation system and a determination result;
converting, by the controller, an operation mode of the vehicle into a parking mode when the parking situation is recognized;
setting, by the controller, an operation sensor based on information on a parking zone received from the navigation system at the time of performing the conversion into the parking mode, and searching for a parking space using the operation sensor; and
controlling, by the controller, parking of the vehicle based on the searched parking space, wherein in the step of recognizing the parking situation of the vehicle, when there is destination information set in the navigation system, the position of the vehicle and the destination information are compared to each other, and the parking situation is recognized when the vehicle is positioned within a preset radius from a destination and the speed of the vehicle is less than a first reference speed, wherein in the step of recognizing the parking situation of the vehicle, when there is no destination information set in the navigation system, the controller checks whether an emergency light of the vehicle is turned-on and whether the speed of the vehicle is less than a second reference speed, and wherein the parking situation is recognized, when the emergency light of the vehicle is turned-on and the speed of the vehicle is less than the second reference speed.

9. The method according to claim 8, wherein in the step of recognizing the parking situation of the vehicle, when there is no destination information set in the navigation system, the position of the vehicle and parking lot information are compared to each other, and the parking situation is recognized when the vehicle enters a parking lot and the speed of the vehicle is less than the second reference speed.

10. The method according to claim 8, wherein in the step of recognizing the parking situation of the vehicle, the parking situation is recognized when the emergency, light or the directional signal of the vehicle is turned-on at the time of driving on a road of a city and the speed of the vehicle is less than the second reference speed.

11. The method according to claim 8, wherein the information on the parking zone received from the navigation system includes at least one of parking form information, parking direction information, and a width and a degree of complexity of a street of the parking zone.

12. The method according to claim 8, wherein the step of searching for a parking space includes:
selecting one or more operation sensors based on the information on the parking zone received from the navigation system; and
setting a search distance and a search period of the selected operation sensor.

13. The method according to claim 12, wherein in the step of selecting one or more operation sensors, when the speed of the vehicle exceeds a third reference speed, and a width of a street of the parking zone is a rotation radius or more of the vehicle, a first sensor positioned in a parking direction is selected as the operation sensor.

14. The method according to claim 12, wherein in the step of selecting one or more operation sensors, when the speed of the vehicle is a third reference speed or less, and a width of a street of the parking zone is within a rotation radius of the vehicle, a first sensor positioned in a parking direction and a second sensor positioned in a direction opposite to the parking direction are selected as the operation sensor.

* * * * *